No. 683,585. Patented Oct. 1, 1901.
E. D. WOODS.
PRUNING IMPLEMENT.
(Application filed Jan. 14, 1901.)
(No Model.) 2 Sheets—Sheet 1.
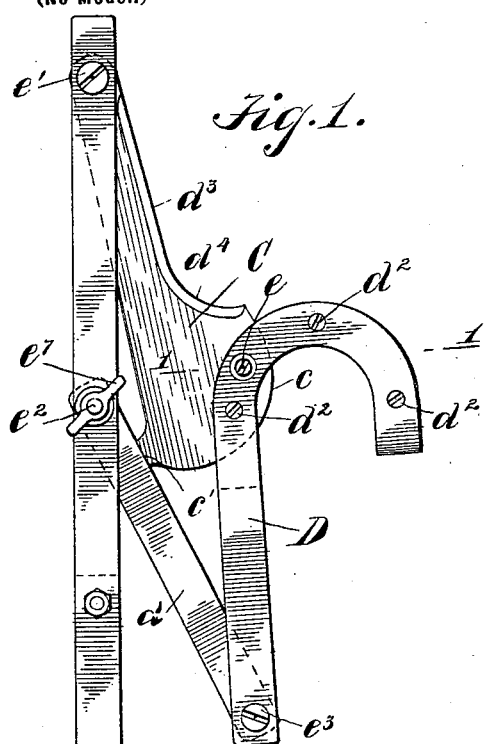
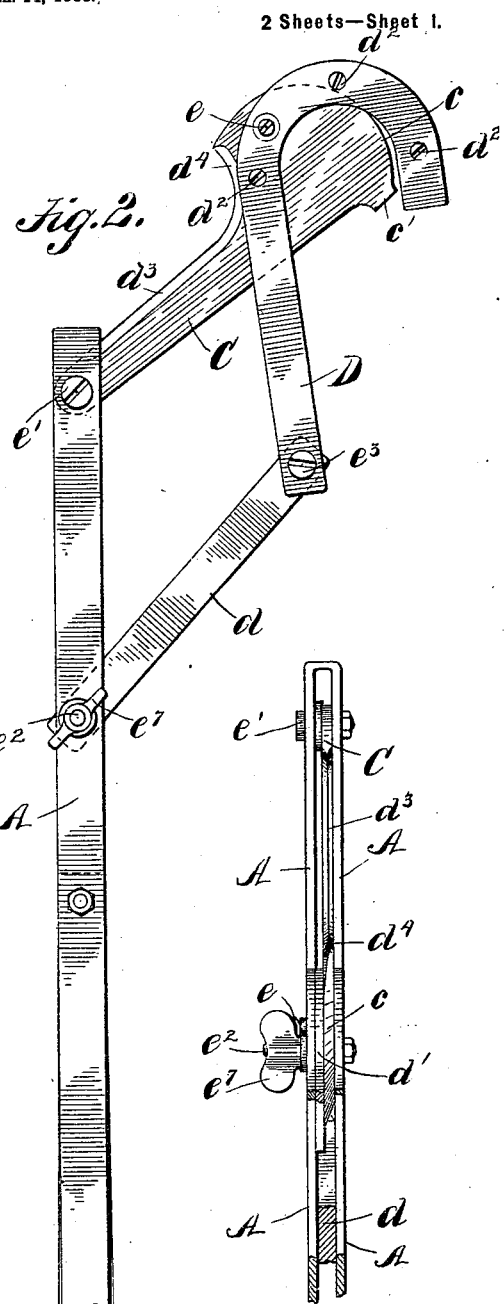
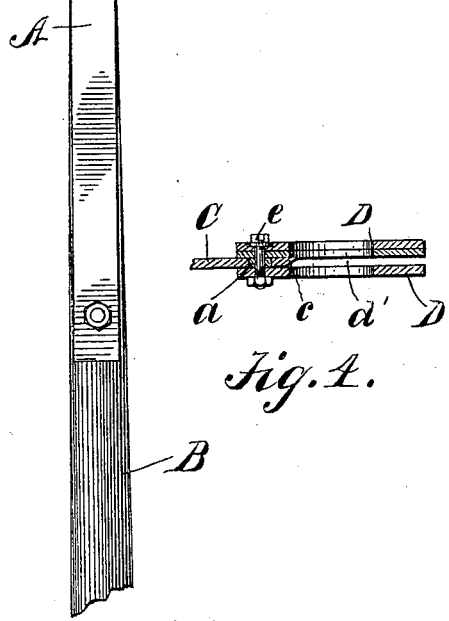
WITNESSES:
INVENTOR
Edward D. Woods
BY
ATTORNEY

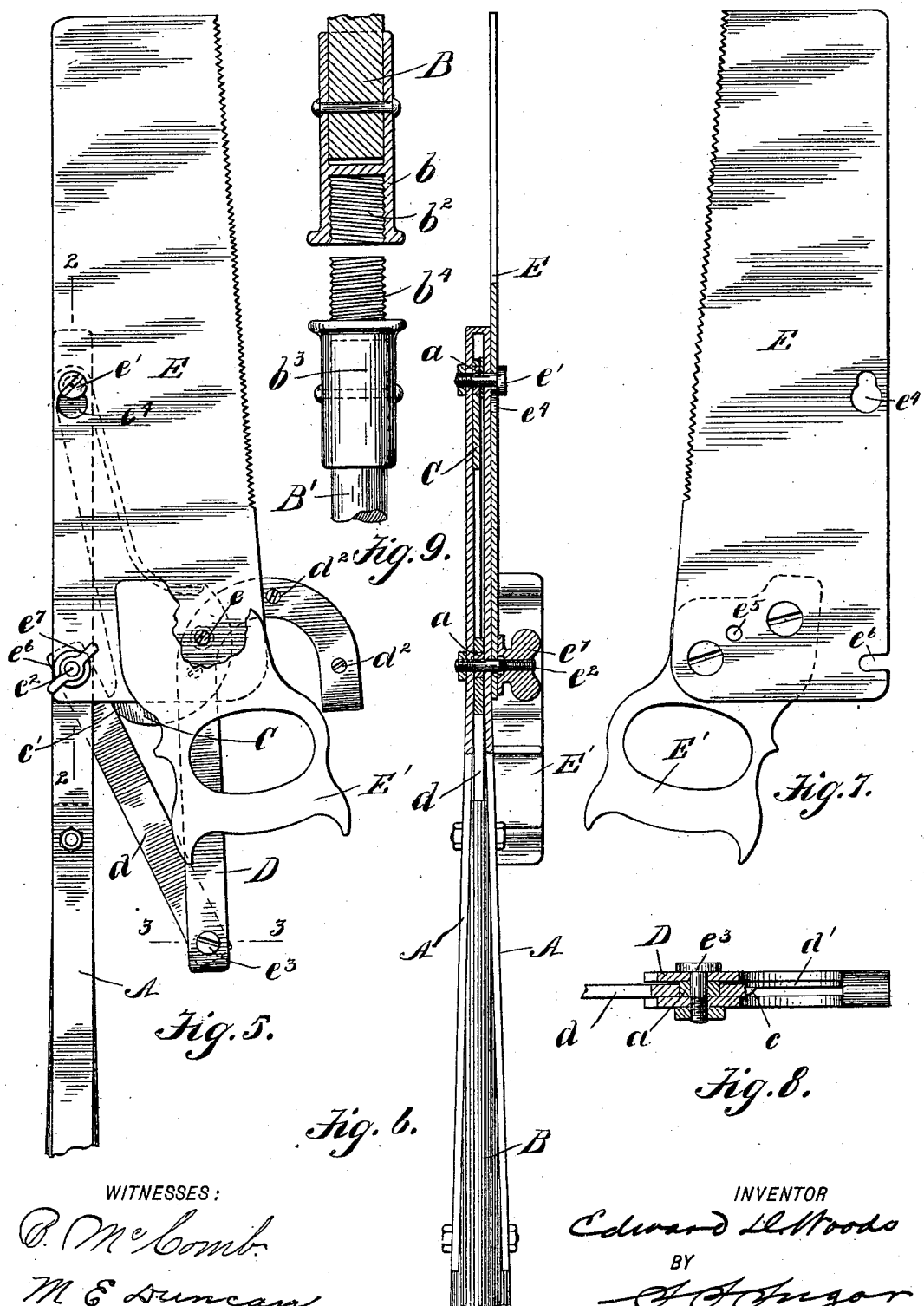

UNITED STATES PATENT OFFICE.

EDWARD D. WOODS, OF NEW YORK, N. Y., ASSIGNOR OF ONE-HALF TO MAX E. DUNCAN, OF SAME PLACE.

PRUNING IMPLEMENT.

SPECIFICATION forming part of Letters Patent No. 683,585, dated October 1, 1901.

Application filed January 14, 1901. Serial No. 43,120. (No model.)

*To all whom it may concern:*

Be it known that I, EDWARD D. WOODS, a citizen of the United States, and a resident of New York city, county of New York, and State of New York, have invented certain new and useful Improvements in Pruning Implements, of which the following is a specification, reference being had to the accompanying drawings, forming a part thereof, in which similar letters of reference indicate corresponding parts.

My invention relates to an improved pruning implement wherein I provide a device having a cutting-blade operating within a hooked end piece and a detachable handsaw adapted to be securely fastened to same and prevent the action of the cutting-blade when the saw is being used.

Heretofore pruning implements have been made with and without the saw attachment; but none have been constructed or designed with the object of providing a detachable saw that may be, when desired, used as a handsaw.

When trimming trees, the operator is often compelled to discard the pruning implement and resort to the ordinary handsaw, which makes it necessary for the user to always carry with him an extra handsaw.

It is with the object of overcoming the inconvenience of carrying the extra saw that I have designed my invention.

It is obvious, therefore, that an implement of this character provided with a saw that may be readily detached and used independent of the rest of the apparatus will be a material improvement over any pruning implement heretofore made.

A further object of my invention is to provide a pruning implement of the character described having a cutting-blade with a particular-shaped upper cutting edge particularly adapted for cutting small twigs and brushwood.

A particular feature of my invention is the improved pivotal joints, which greatly facilitate the operation of my device, and further features are the use of the plate secured in the hooked end piece, against which the cutting-blade is adapted to engage, and the sectional handle and couplings, as will be hereinafter fully described.

Referring to the drawings, Figure 1 is a general side view of my device without the handsaw and shows the position of the parts just before the device is hooked over the limb of the tree. Fig. 2 is a side view of my device, showing the position of the parts just after the limb has been cut. Fig. 3 is a front view of the upper part of the device, showing the lower end of the hooked portion broken away to better illustrate the cutting-blade. Fig. 4 is a sectional view taken on the line 1 1 of Fig. 1. Fig. 5 is a view similar to Fig. 1 and shows the handsaw attached. Fig. 6 is a rear view of the device shown partly in section, the sectional part being taken through the line 2 2 of Fig. 5. Fig. 7 is a view of the handsaw detached. Fig. 8 is an enlarged sectional view taken through the line 3 3 of Fig. 5, and Fig. 9 is a detail view of the handle-coupling.

In practice I provide the parallel rods A, which are securely fastened to a pole or handle B by any suitable means. Between the upper ends of the rods A, I pivotally fasten the cutting-blade C, which is also pivotally fastened to the upper inner end of a hooked portion D, the lower end of which is in turn connected to the rods A by means of the connecting-bar $d$. The said connecting-bar is pivotally fastened to both the hook portion or member D and the rods A. The outer edge of the cutting-blade C is formed with a segmental cutting edge $c$, beveled from one side only, as clearly illustrated in Figs. 3 and 4. This edge is adapted to engage against the plate $d'$, which is securely fastened in the upper hooked end of the hook member D by means of the screws $d^2$. The upper outer edge of the cutting-blade C is formed with a cutting edge which runs in a straight line for about half the length of the blade, as at $d^3$, and ends in a curve, as at $d^4$, forming thereby a hook-shaped knife, which is especially adapted for the purpose hereinafter set forth. At the end of the segmental cutting edge $c$ I form a blunt end $c'$, which is adapted to engage against the bar d and act as a stop to the downward movement of the parts. The parts are held together at the pivotal joints by means of suitable bolts e, e', e², and e³; but interposed between the parallel rods A and the sides of the hooked member D are the bushings a, which encircle the bolts and which are made slightly wider than the cutting-blade C and the connecting-bar d, through which they pass, and are employed to prevent the binding of the parts when the tightening-nuts are securely fastened.

E designates a handsaw provided with an ordinary handle E' and adapted to be attached to the device when the device is in the position shown in Fig. 1. The perforation $e^4$ in the saw E engages over the head of the bolt e' and locks beneath same in the manner shown in Figs. 5 and 6. The perforation $e^5$ engages over the head of the bolt e, while the slot $e^6$ engages around the bolt $e^2$. The thumb-nut $e^7$ is employed to securely lock the saw when in position. In Fig. 5 a portion of the handle is broken away to show the bolt e. The handle B may be of any desirable length or may be made up in sections, as will be hereinafter described.

In use the hook member is hooked over the limb to be cut and by a steady pull upon the handle the segmental cutting edge c (being eccentrically mounted with relation to its outer edge) moves out to the position shown in Fig. 2 and cuts through the limb or branch. The hook-shaped formation of the cutting edge $d^3$ and $d^4$ enables the operator to use the device for cutting small twigs and branches which are not strong enough to bear the pressure of the device when the hook is used, and this curved cutting edge is also especially adapted to cut brushwood and small bushes. When it is desired to cut a limb too large for the hook member, the saw E is attached in the proper manner and the operator can then cut the limb by sawing. Again, should the limb be so large as to make it impossible to cut it with the saw attached to the pole the operator can very readily detach the saw and provided with this instrument he can climb the tree and cut off the desired limb.

When cutting brushwood or low vines with my implement, the ordinary handle will be found too long for convenience and will be objectionable therefore. To obviate this objection, I provide the handle B with the coupling b, suitably fastened to it about four and and one-half feet from the end of the pruner. With this short handle the operation of cutting brushwood or small vines is greatly facilitated. To attach to this short handle B, I provide a secondary handle B', of any desired length, provided with a detachable connection or coupling $b^3$, formed with the threaded portion $b^4$, which is adapted to engage with the threaded portion of the coupling b. It is obvious that the lower end of the secondary handle is provided with a coupling similar to that at the end of the handle B, to which a third section of handle may be attached.

The use of the bushing a, as hereinbefore stated, prevents the binding of the parts and enables me to produce a device whose operation is perfect, free, and easy, and by securing the plate d' to the projecting hook portion or member and beveling the cutting edge c on the side opposite the said plate I provide a better cutting device than has heretofore been made.

Heretofore pruning implements have not been constructed which embodied all the conveniences set forth in my invention and none have been made which embodied a detachable handsaw.

I am aware that prior to my invention pruning implements have been made having an outer hook portion pivotally fastened and connected to parallel side rods by means of a connecting-bar and cutting-blade having an outer segmental cutting edge and a straight upper cutting edge, the said outer segmental cutting edge of the cutting-blade being adapted to operate when a downward pull is exerted upon the handle on which the device is mounted. I am also aware that pruning implements have been made with a saw attachment in combination with a cutting-blade having a projecting arm and operated by means of a string or second rod. I do not therefore claim directly any of the above constructions; but What I do claim, and desire to secure by Letters Patent, is—

1. In an improved pruning implement as herein described, the combination with the projecting hook portion, parallel side rods, cutting-blade, connecting bar and handle, of a handsaw adapted to be attached to said projecting hook portion and parallel side rods, bolts adapted to engage in openings in said saw and afford a means for attaching same to the said parallel side rods, a projecting bolt-head secured to the said hook portion and adapted to engage in an opening in the saw for the purpose of locking the said hook in position and prevent its movement when the saw is attached, and a thumb-screw employed to securely fasten and lock the parts when the saw is attached, substantially as described.

2. In an improved pruning implement as herein described, the combination with the projecting hook portion, parallel side rods, connecting bar and handle, of the cutting-blade pivotally connected to the said projecting hook portion and parallel side rods; said cutting-blade having an outer segmental cutting edge and a hook-shaped upper cutting edge formed upon the said cutting-blade, a plate securely fastened to the upper end of the aforesaid hook portion and against which the said outer segmental cutting edge of the cutting-blade is adapted to engage, and bushings interposed between the aforesaid parallel side rods and sides of the said projecting hook portion and encircling the posts which hold together the parts, substantially as described.

3. In an improved pruning implement as herein described, the combination with a projecting hook portion, parallel side rods, connecting bar and handle, of a cutting-blade pivotally connected to the said projecting hook portion and parallel side rods, said cutting-blade having an outer segmental cutting edge and a hook-shaped upper cutting edge, a plate securely fastened in the upper end of the aforesaid hook portion against which the outer segmental cutting edge of the cutting-blade is adapted to engage, bushings interposed between the aforesaid parallel side rods and sides of the said projecting hook portion and encircling the bolts which hold together the parts, a detachable handsaw adapted to be securely fastened to the aforesaid projecting hook portion and parallel side rods, and means for locking the parts when the saw is attached, substantially as described.

4. In an improved pruning implement as herein described, the combination with the projecting hook portion, parallel side rods, connecting-bar and a sectional handle provided at its ends with suitable couplings, of the cutting-blade pivotally connected to the said projecting hook portion and parallel side rods; said cutting-blade having an outer segmental cutting edge and a hook-shaped upper cutting edge formed upon the said cutting-blade, a plate securely fastened to the upper end of the aforesaid hook portion and against which the said outer segmental cutting edge of the cutting-blade is adapted to engage, and bushings interposed between the aforesaid parallel side rods and sides of the said projecting hook portion and encircling the posts which hold together the parts, substantially as described.

In testimony that I claim the foregoing as my invention I have signed my name, in presence of two witnesses, this 13th day of December, 1900.

EDWARD D. WOODS.

Witnesses:
   B. McComb,
   S. S. Sugar.